Oct. 5, 1971     P. H. STIBBE     3,610,067
STEERING GEAR FOR TRACTORS
Filed April 15, 1970                    2 Sheets-Sheet 1
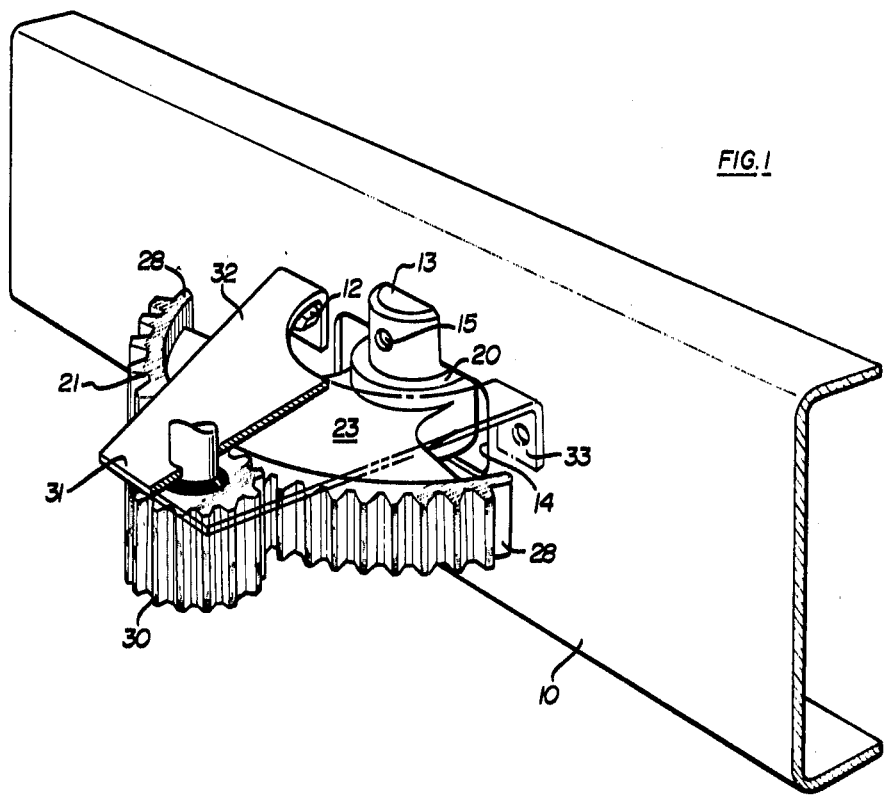
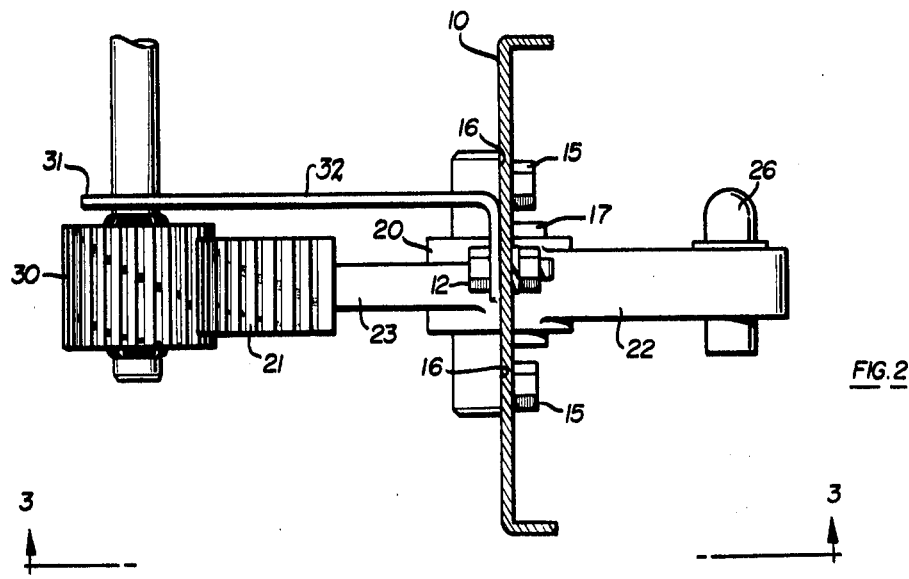
INVENTOR.
PAUL STIBBE.
BY
CULLEN, SETTLE, SLOMAN & CANTOR.
ATT'YS.

INVENTOR.
PAUL STIBBE.
BY
CULLEN, SETTLE, SLOMAN & CANTOR.
ATT'YS.

United States Patent Office 3,610,067
Patented Oct. 5, 1971

3,610,067
STEERING GEAR FOR TRACTORS
Paul H. Stibbe, Neenah, Wis., assignor to
J. I. Case Company, Racine, Wis.
Filed Apr. 15, 1970, Ser. No. 23,104
Int. Cl. B62d *3/12;* F16h *57/00*
U.S. Cl. 74—498                                    4 Claims

ABSTRACT OF THE DISCLOSURE

A steering apparatus of the pinion gear and sector gear type, with double adjustment mountings on a frame rail of a vehicle and journaling the sector gear and a cantilever bracket for supporting the pinion gear; the pin and bracket are adjustably mounted on the frame rail to provide universal adjustment of the various parts.

GENERAL DESCRIPTION

This application discloses a novel steering apparatus characterized by its extreme simplicity of design and ease and simplicity of installation into a vehicle frame such as a tractor frame, and simple and easy adjustment of the gear parts and the steering apparatus as a whole, and providing effective and easy steering, while using simple and inexpensive components.

THE EMBODIMENT

A specific embodiment has been disclosed by way of example in the appended drawings:

In the drawings:

FIG. 1 is a perspective side view of the steering apparatus shown attached to the frame of a vehicle;

FIG. 2 is a side elevation of the steering apparatus shown in FIG. 1;

DETAILED DESCRIPTION

Figure 3:
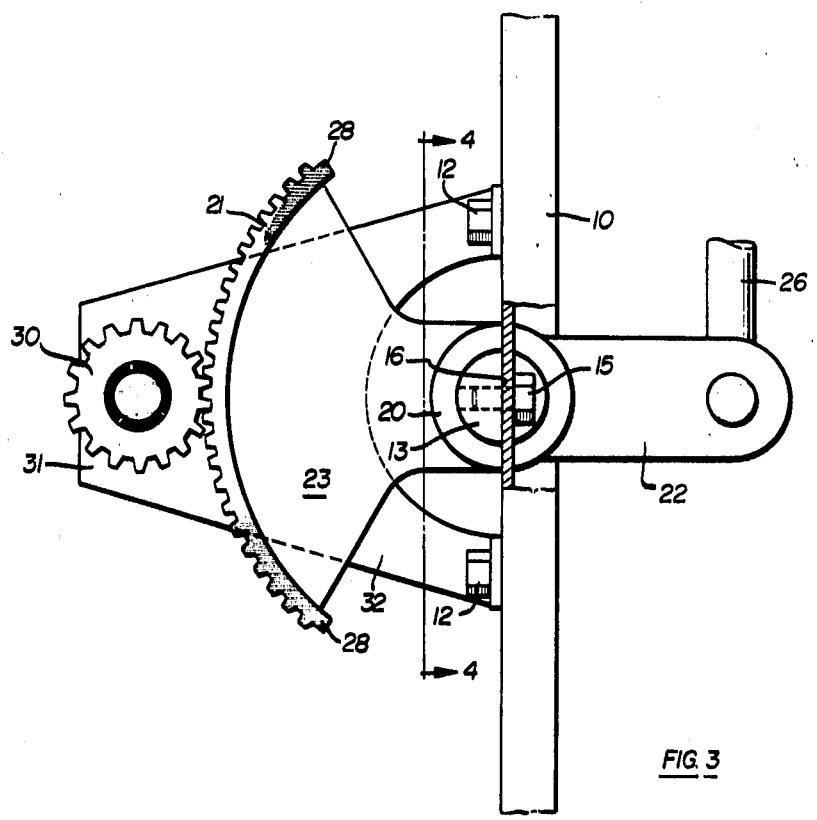
FIG. 3 is a bottom plan view of the steering apparatus shown in FIG. 1.
Figure 4:
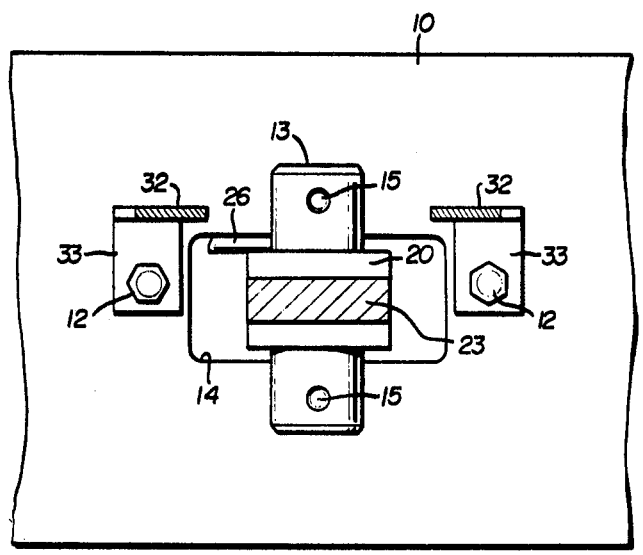
FIG. 4 is a cross-section through the support bracket and sector gear as seen along line 4—4 in FIG. 3.

The several figures in the drawing show a frame rail 10 having an opening or slot 14 across which is mounted a journaling pin 13, the latter being secured at two points on the rail as shown by screws 15 which thread through flattened ends 16 of the pin 13 and directly into the frame above and below the slot 14.

The round center portion 17 of the pin 13 is within slot 14 and provides a bearing or journal portion for the hub 20 of a sector gear 21 which has oppositely extending arms 22 and 23 which project from opposite sides of the rail at the slot. Arm 22 of the sector gear is connected to a drag link 26 of a steering apparatus in the usual manner. Arm 23 of the sector gear is itself the sector gear part, having gear 21, and having stops 28 at its ends.

The remainder of the steering apparatus so far as need to be described at present comprises a pinion gear 30 which is mounted in the outboard end portion 31 of a cantilever bracket 32 of A-style with the base ends 33 of the bracket 32 being secured to the frame rail on opposite sides of the slot 14 as by suitable mounting screws 12.

ADJUSTMENTS

Shims, not shown, may be provided at the mounting screws 12 for adjustably mounting the bracket 32 to the frame rail. Shims, not shown, may also be provided as desired between the flat ends 16 of the bearing pin 13 and the frame rail for adjusting the mounting of the pin 13 to the frame rail. These two adjustments are simple and easy and provide considerable relative adjustment of the gears and gear teeth. They may be made during initial assembly of the parts or at any time after the vehicle has been in use.

It is to be noted that the sector gear 21 is of such a combination that it may be easily made of inexpensive material, as for example, of a cast gray iron composition. The mounting for such gear, provided by pin 13 is a simple and easy mounting yet easily capable of considerable adjustment. Pin 13, straddling slot 14, reinforces and rigidifies the frame rail at slot 14.

The steering apparatus herein disclosed is mounted directly on the frame in a simple and easy manner. The sector gear is mounted directly by means of pin 13 and the pinion gear is mounted simply by means of the bracket 32. The mounting of the parts is extremely easy and simple and this is a major feature of the present embodiment.

Now, having described the embodiment herein disclosed, reference should be had to the claims which follow.

What is claimed is:

1. A steering apparatus comprising a pinion gear, a sector gear, and means for mounting the same comprising a frame rail having an opening therein; a bearing pin mounted on said frame rail and straddling said opening and having a central round bearing portion at said opening; a sector gear having a hub journaled on said bearing portion at said opening and having arms extending from both sides of said hub, with one arm extending through said opening; and a pinion gear support bracket mounted on said frame in outboard manner adjacent said opening; with the bracket being a cantilever beam with a fixed end at the rail near said opening and its outboard end journaling the pinion gear.

2. Apparatus according to claim 1 wherein the bracket and pin are adjustably mounted on the rail and wherein the two adjustments provided by the adjustable mountings of the pin and the outboard bracket on the rail provide relative adjustments of the pinion gear and the sector gear.

3. Apparatus according to claim 1 wherein the bracket is A-shaped with the apex being the portion that supports the pinion gear and with the base ends being fixed to the rail on opposite sides of the opening pin.

4. Apparatus according to claim 1 wherein the pin has flat ends fixed to the rail above and below the opening.

References Cited
UNITED STATES PATENTS

| | | | |
|---|---|---|---|
| 729,776 | 6/1903 | Lemp et al. | 280—96 X |
| 845,127 | 2/1907 | Schiele | 74—498 |
| 866,133 | 9/1907 | Herzog | 280—96 X |
| 1,056,942 | 3/1913 | Rogers | 280—97 |
| 1,341,349 | 5/1920 | Ward | 74—498 |
| 1,361,668 | 12/1920 | Bell et al. | 280—97 |
| 2,284,179 | 5/1942 | Thelin | 74—89.18 |
| 3,449,981 | 6/1969 | Price | 74—498 |

CARLTON R. CROWLE, Primary Examiner

T. C. PERRY, Assistant Examiner

U.S. Cl. X.R.
74—397; 280—96